United States Patent [19]
Sykes

[11] Patent Number: 5,899,327
[45] Date of Patent: May 4, 1999

[54] PROTECTIVE STORAGE CASE FOR DIGITAL DISCS, COMPUTER GAME CARTRIDGES AND THE LIKE

[75] Inventor: Philip K. Sykes, Shoreview, Minn.

[73] Assignee: UFE, Inc., Stillwater, Minn.

[21] Appl. No.: 08/962,009

[22] Filed: Oct. 31, 1997

[51] Int. Cl.⁶ ........................................................ B65D 85/57
[52] U.S. Cl. ..................................... 206/307.1; 206/308.1; 206/312; 206/387.13; 206/472
[58] Field of Search .............................. 206/307.1, 308.1, 206/387.13, 309, 312, 472, 387.1

[56] References Cited

U.S. PATENT DOCUMENTS

| | | |
|---|---|---|
| 3,532,211 | 10/1970 | Gellert . |
| 4,184,594 | 1/1980 | Hehn . |
| 4,428,481 | 1/1984 | Basili . |
| 4,703,853 | 11/1987 | Byrns . |
| 4,722,439 | 2/1988 | Grobecker et al. . |
| 4,753,347 | 6/1988 | Bellante et al. . |
| 4,838,422 | 6/1989 | Gregerson . |
| 4,869,364 | 9/1989 | Bray . |
| 4,905,217 | 2/1990 | King et al. ............................ 206/312 X |
| 5,253,246 | 10/1993 | Leonhardt et al. . |
| 5,263,580 | 11/1993 | Ciba et al. ............................. 206/308.1 |
| 5,267,647 | 12/1993 | Stumpff et al. ........................ 206/308.1 |
| 5,284,242 | 2/1994 | Roth et al. . |
| 5,310,054 | 5/1994 | Stumpff et al. . |
| 5,341,924 | 8/1994 | Morrone ................................ 206/309 X |
| 5,344,039 | 9/1994 | Taniyama .............................. 206/309 X |
| 5,360,106 | 11/1994 | Nakayama et al. . |
| 5,443,159 | 8/1995 | Cheng ............................. 206/387.13 X |
| 5,529,182 | 6/1996 | Anderson et al. . |
| 5,549,203 | 8/1996 | Weisburn et al. ......................... 206/472 |
| 5,551,560 | 9/1996 | Weisburn et al. . |
| 5,573,120 | 11/1996 | Kaufman et al. . |
| 5,586,654 | 12/1996 | Katagiri et al. . |
| 5,597,068 | 1/1997 | Weisburn et al. . |
| 5,732,818 | 3/1998 | Koehn ................................... 206/308.1 |
| 5,772,028 | 6/1998 | Marsuko et al. ...................... 206/387.1 |

Primary Examiner—Bryon P. Gehman
Attorney, Agent, or Firm—Leonard Tachner

[57] ABSTRACT

A universal media storage container for any of a number of different media devices including compact discs, digital video discs and game cartridges. The container accommodates some media both in and out of the manufacturer's container. A unique disc loading and retention structure renders the container easier to use and even more secure in protection of digital discs. The media enclosure of the invention comprises a pair of rectangular, planar sides interconnected by a spline and configured for forming an enclosed rectangular volume. One of the planar sides provides various integral structural members to receive discs, cartridges, etc. in a secure and protected position. In addition, various members facilitate receiving digital discs on a plurality of hub members to provide convenient and secure storage of such discs.

7 Claims, 8 Drawing Sheets

PROTECTIVE STORAGE CASE FOR DIGITAL DISCS, COMPUTER GAME CARTRIDGES AND THE LIKE

FIELD OF THE INVENTION

The present invention relates generally to the field of media containers and more specifically to the field of protective storage cases for digital discs, computer game cartridges and the like.

PRIOR ART

The following U.S. patents appear to be relevant to the invention in varying degrees:

| | |
|---|---|
| 3,532,211 | Gellert |
| 4,184,594 | Hehn |
| 4,428,481 | Basili |
| 4,703,853 | Byrns |
| 4,722,439 | Grobecker et al |
| 4,753,347 | Bellante et al |
| 4,838,422 | Gregerson |
| 4,869,364 | Bray |
| 5,253,246 | Leonhardt et al |
| 5,284,242 | Roth et al |
| 5,310,054 | Stumpff et al |
| 5,341,924 | Morrone |
| 5,344,039 | Taniyama |
| 5,360,106 | Nakayama et al |
| 5,529,182 | Anderson et al |
| 5,573,120 | Kaufman et al |
| 5,586,654 | Katagiri et al |
| 5,597,068 | Weisburn et al |

The following appear to be the most relevant of those patents listed above:

U.S. Pat. No. 5,253,246 to Leonhardt is directed to a universal data storage element which allows the user to include a variety of media types in a standard exterior housing. They system allows the user to connect a diversity of drive elements to the computer system without having to have a corresponding diversity in media element handling systems. This is accomplished by using a standardized data storage element adapted to receive any one of a plurality of different media types. The universal data storage element 100 consists of an exterior housing 101 with a body 102 and an access door 103. Within housing 101 there is a carrier 110 which is mounted on guide rails 111 and 112 which is adapted to carry various media types so that the various media types may be accessible by a single carrier system.

U.S. Pat. No. 5,586,654 to Katagiri et al is directed to a cassette accommodating case wherein positioning projections with inclined surfaces are provided in order to give a more secure holding of the cassette. The guiding inclined surface provides for correcting the position of the cassette as it is inserted into the case. When the cover section is closed, the inclined surfaces abut against the ends of side projections of the tape cassette in order to push the tape cassette into position when the cover sections are closed. The object of the invention is to provide an accommodating case in which it is possible to more easily position the cassette within the case. Referring to FIG. 6, the case 6 comprises a cover section 61 and a casing section 62 with a pocket 64 to accommodate a tape cassette 2. An inclined surface 78 is provided at one side edge of projection 71 in order to guide the cassette 2 into position when inserted into the case. The second guided inclined surface 79 is provided at the outer side edge of projection 71 so that the cassette may be inserted in either direction. Referring now to FIG. 20, the backward-pressing surface 94 is an inclined surface that it contacts the front end of tape 2 when loaded into the case and thus restricts transverse movement of the cassette 2 in cooperation with the rotation-preventing projection 67.

U.S. Pat. No. 4,428,481 to Basili is directed to a universal storage container for video cassettes and is adapted to receive either beta cassettes or VHS cassettes. The pair of mounting posts are disposed on the bottom wall and are positioned to be accepted into the central mounting holes of either type of cassettes when the reels of the cassettes are biased in one direction or another. A second feature of the storage container seen in this invention is the construction of the rear wall 30 which is defined by opposed edges 32 and 34. Closure flanges 36 and 38 are mounted on the rear wall parallel to and slightly spaced from the edges 32 and 34. Thus, when the top and rear walls 12 and 30 are rotated into a perpendicular alignment with respect to one another, the closure flanges 36 and 38 will be adjacent side walls 24 and 26 and on in the inside of the container. Thus, the case provides a closed environment for the cassettes held therein FIGS. 2 and 4 show a beta size video cassette 62 mounted in the universal storage container 10, while FIGS. 3 and 5 show a VHS size cassette mounted within container 10.

U.S. Pat. No. 4,838,422 to Gregerson is directed to a data storage container for a disk cartridge such as an optical or magnetic disk. The disk container has a pair of parallel protruding rails on the outer surface of the planar member such that the disk is held in position under the lips thereof. FIG. 7 illustrates a top view of the disk cartridge 110 held within data storage container 10 such that the cartridge 110 is slid into the storage container and the catch 94 is forced past the end of sidewall 22 until the catch 94 springs into notch 114 in the edge of the disk cartridge 110. Panel member 54 includes a top surface 66 and an adjacent angled surface 68. A corresponding angled surface 72 is seen in top surface 70. Side 58 includes a lip 74 which extends the length of side 58 and the side 60 includes a lip 76 extending the length of side 60 forming a flexible channel member 78, and a corresponding flexible channel member 80 in order to receive the disk cartridge.

U.S. Pat. No. 4,722,439 to Grobecker et al is directed to a disk receiving tray and a combination of such a tray with a cassette. Referring to FIG. 3, the side 12 of tray 1 is formed with a beveled edge 27 which serves to facilitate insertion of the tray into a storage cassette 28. The storage cassette 28 comprises a bottom 29 and a lid 30 which are pivotally connected to each other by means of a hinge 31. Hinge 31 comprises hinge openings 32 in the bottom section 29 and hinge pins 33 which engage these openings 32. The openings 32 thus latch the tray in the bottom section 29 and connect the lid pivotally to the bottom.

U.S. Pat. No. 3,532,211 to Gellert is directed to a storage case tape cartridge which has ramped guidance members to facilitate the insertion of the cassette. Referring to FIG. 4, it is seen that ramp member 20 raises the rear edge of the cassette clear of the rod 55 and into a correct position relative to the locating lugs 20 so that when the cover is pressed open, the back edge of cover 14 will not come into contact with the adjacent edge of the cassette. The precise positioning of a cassette 9 within case 10 is provided by ramp members 20 and associated back wall locating lugs 21 together with a pair of spacer bars 61 molded into the case cover wall 16.

U.S. Pat. No. 5,597,068 to Weisburn et al is directed to a compact disc security container which has tabs extending from the bottom wall with latching flanges extending from the ends of the tabs. The tabs and flanges of interest may be seen in FIGS. 1, 6 and 8, wherein flexible tabs 29 and 30 project orthogonally from bottom wall 3 into storage compartment 7 of container 1. Tabs 29 and 30 are formed with inwardly extending latching flanges 33 and 34 which serve to hold the disc in position within the jewel box 70.

U.S. Pat. No. 5,341,924 to Morrone is directed to a media storage apparatus for the storage of disc-type media. Of particular interest are the retaining members 267 as seen in FIGS. 30 and 31. Retaining members 267 are formed in the bottom portion of the storage apparatus and are used to keep the disc from coming in contact with the base and also for restricting side-to-side movement of the disc. FIG. 42 shows an alternate case construction including a stepped base 291 and a cover 292 having a ledge 293. The ledge 293 is intended to retain the identification member 294 in position. A variety of other embodiments and features are also seen in this invention.

U.S. Pat. No. 4,869,364 to Bray is directed to a container for thin objects and in one case is adapted to receive either 3½" and/or 5¼" diskettes. Referring to FIG. 2, the tray comprises a substantially planar surface 20b which surrounds a rectangular recessed area 23 in which there is located a smaller rectangular recessed area 24. Recessed areas 23 and 24 are sized to accommodate the two conventional sizes of "floppy" diskettes.

U.S. Pat. No. 5,310,054 to Stumpf et al is directed to a storage container for disk-shaped. objects and comprises a base tray with a cover that is connected by means of a hinge means. Referring to FIGS. 4 and 5, it is seen that when disk 13 is placed into the tray, rim 37 is biased and is provided to hold disk 13 in place.

From the above-described prior art, it will be observed that there is no adequate media container for storage of a variety of delicate discs and cartridges. Containers of the prior art are not well suited for storing audio discs, digital video discs, and game cartridges, as well as discs and cartridges within their own manufacturer-supplied containers such as jewel-box containers. Media containers can be extremely advantageous for protective storage of such media such as during shipment or in rental establishments for ensuring safe handling even under the most adverse conditions. A universal container, capable of receiving numerous different media with and without their attendant containers, would add the advantages of external shape uniformity and cost effectiveness.

Thus there is still an unmet need for such a universal container.

SUMMARY OF THE INVENTION

The present invention meets the aforementioned need by providing a universal media storage container for any of a number of different media devices including compact discs, digital video discs and game cartridges. Moreover, the container of the present invention accommodates some media both in and out of the manufacturer's container. Furthermore, the present invention provides a unique disc loading and retention structure which renders the container easier to use and even more secure in protection of digital discs.

The media enclosure of the invention comprises a pair of rectangular, planar sides interconnected by a spline and configured for forming an enclosed rectangular volume. One of the planar sides provides various integral structural members to receive discs, cartridges, etc. in a secure and protected position. In addition, various members facilitate receiving digital discs on a plurality of hub members to provide convenient and secure storage of such discs.

OBJECTS OF THE INVENTION

It is therefore a principal object of the present invention to provide a universal media storage container for protectively enclosing a plurality of differently shaped media devices including digital discs and game cartridges.

It is another object of the invention to provide a media storage container configured for storing digital discs either within their manufacture-supplied jewel boxes or without such boxes.

It is still another object of the invention to provide a disc storage box which effectively locks a disc in its storage location when the box is closed.

It is still an additional object of the invention to provide a digital disc storage box which provides easier and more convenient placement of a disc in its storage position.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 5, comprising FIGS. 5a through 5d, is a sequential illustration of the insertion of a digital disc into the tray side of the invention;

FIG. 6, comprising FIGS. 6a through 6e, is a sequential illustration of the locking of a digital disc into its stored position in the tray side of the invention; and FIG. 7, comprising FIGS. 7a through 7f, is an illustration of the tray side interior showing various different media devices in their stored position within the invention.

DETAILED DESCRIPTION OF A PREFERRED EMBODIMENT

Referring to the accompanying figures, it will be observed that a media enclosure 10, in accordance with a preferred embodiment of the invention comprises a tray side 12, a cover side 14, a spline 24 and three contiguous vertical walls 16. The walls 16 are provided with interior long supports 18 and short supports 19. A pair of cushioning supports 22 and 23 provide added protection and receive closure members 26 and 27 when the media enclosure is in its closed configuration.

A digital disc 11 (see FIG. 5) may be received on a plurality of hub members 20 in a manner which will be described in more detail hereinafter. The walls 16 are provided with a pair of triangular notches 28 which receive a pair of triangular ribs 30 when the cover side 14 is mated with the tray side 12 upon rotation of the spline 24 in the manner shown, for example, in FIG. 6. In addition, side closure ribs 21, 29 and 39, as well as spline ribs 31 and 32 and spline margin 33 are designed to mate with the edge surfaces of walls 16 upon closing of the enclosure 10.

Figure 1:
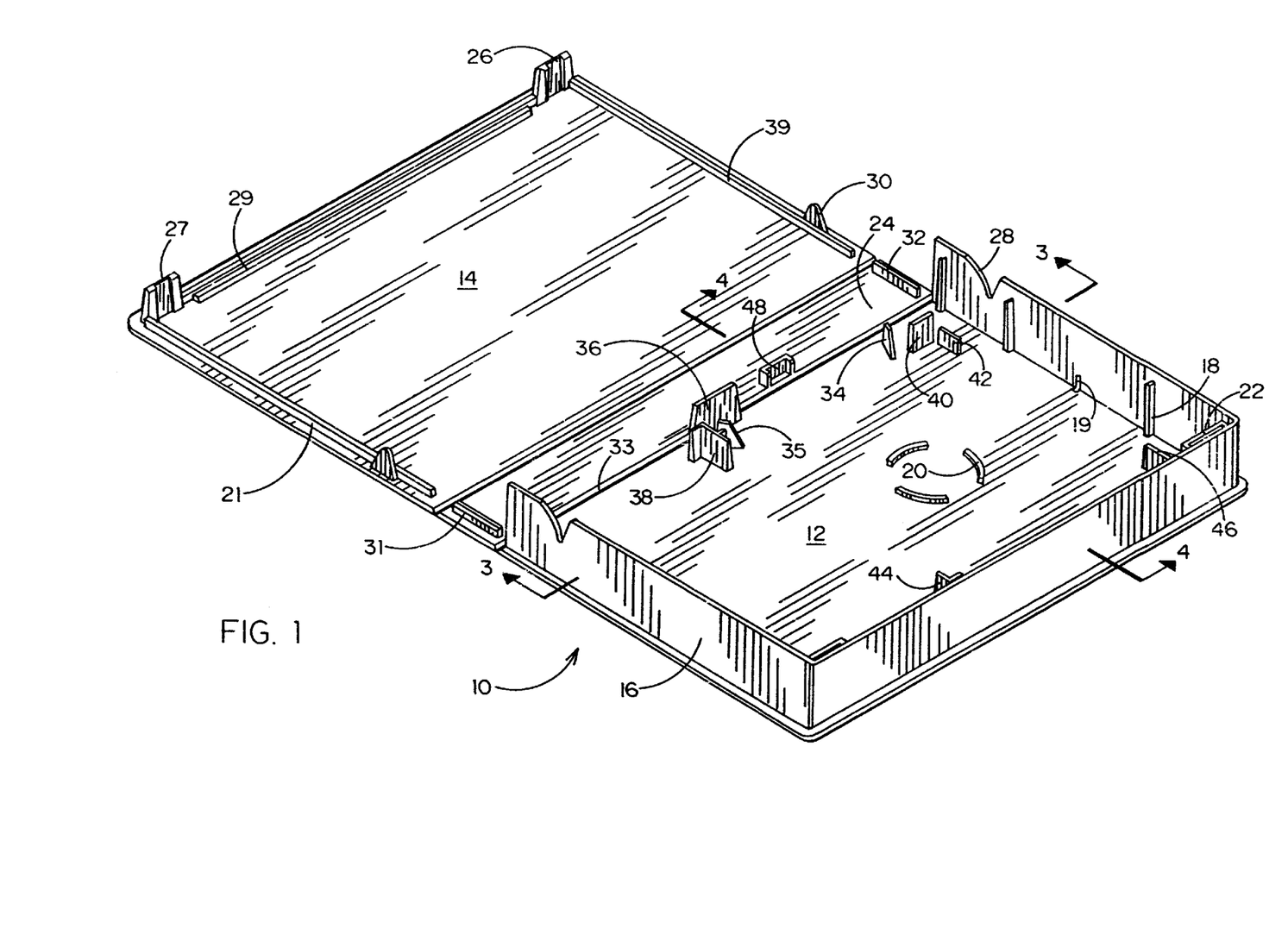
FIG. 1 is a three-dimensional view of the invention shown in its fully open configuration.
Figure 2:
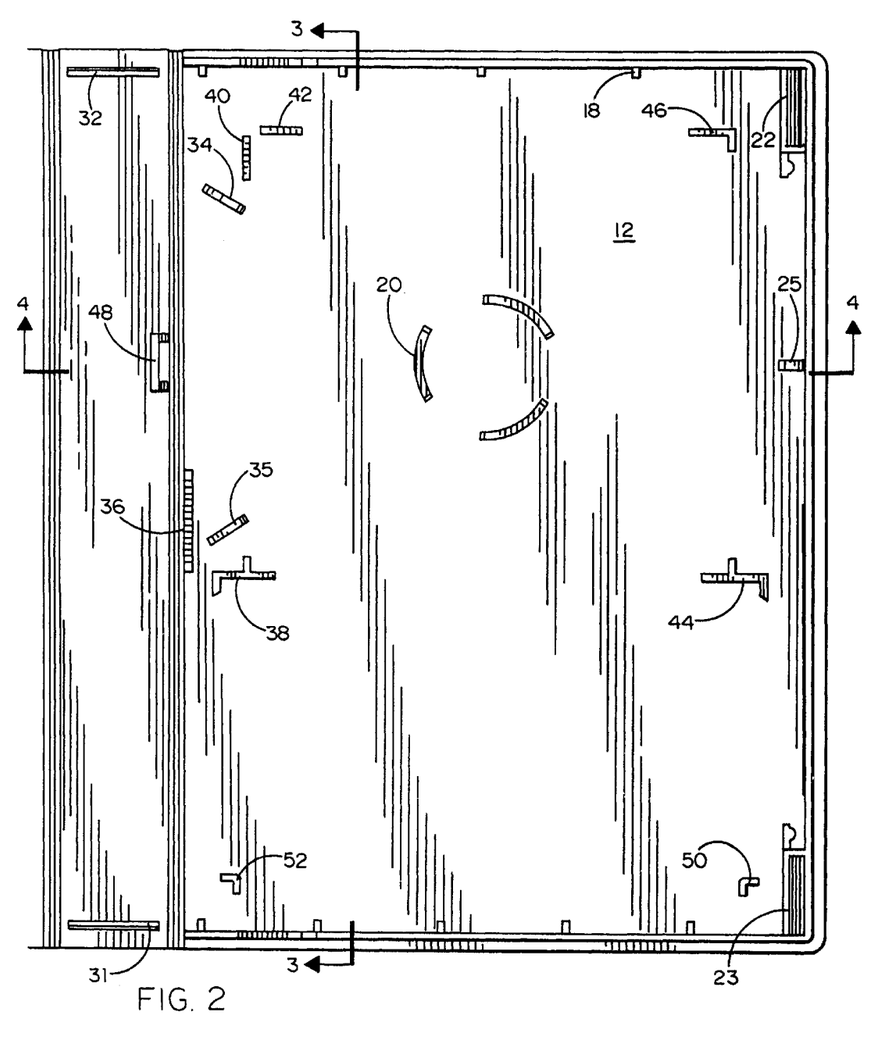
FIG. 2 is a top view of the tray side and spline of the invention illustrating the interior portions thereof.
Figure 3:
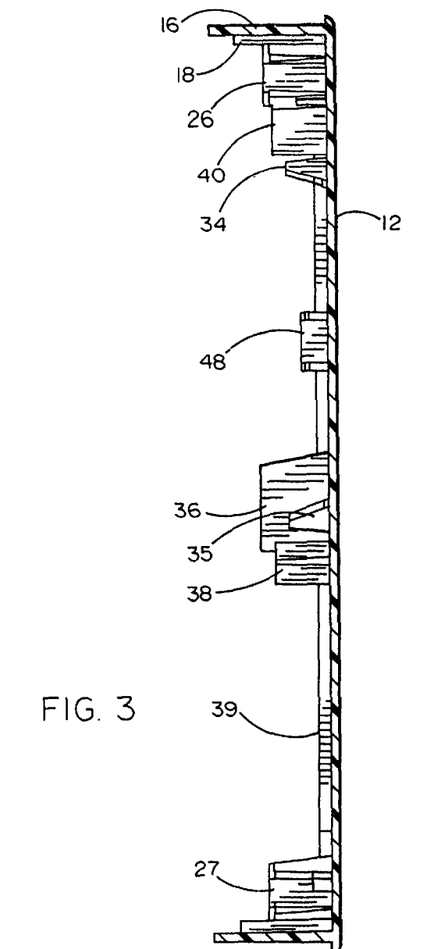
FIG. 3 is a cross-sectional view of the tray side taken along lines 3—3 of FIGS. 1 and 2.
Figure 4:
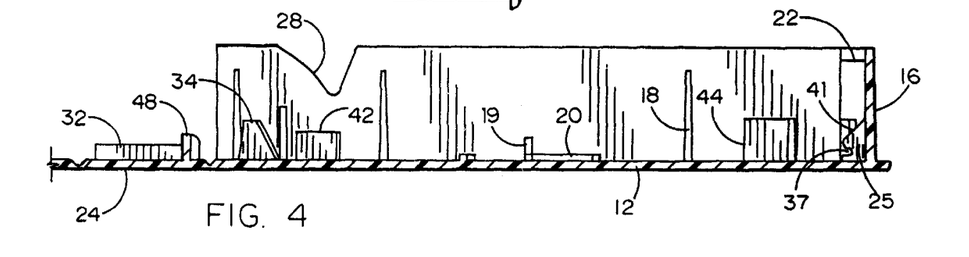
FIG. 4 is a cross-sectional view of the tray side taken along lines 4—4 of FIGS. 1 and 2.
Figure 5A:
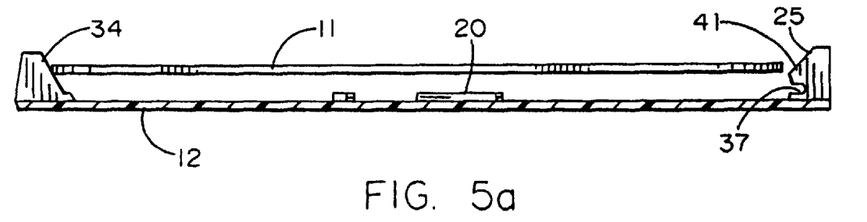
Figure 5B:
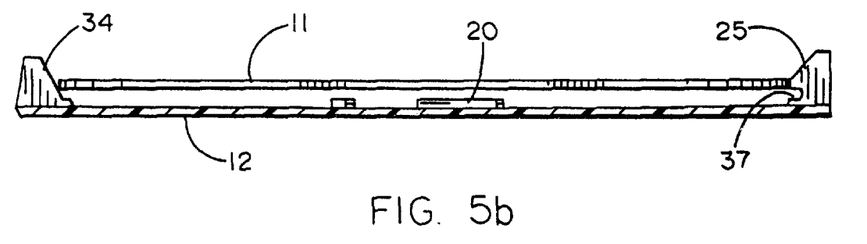
Figure 5C:
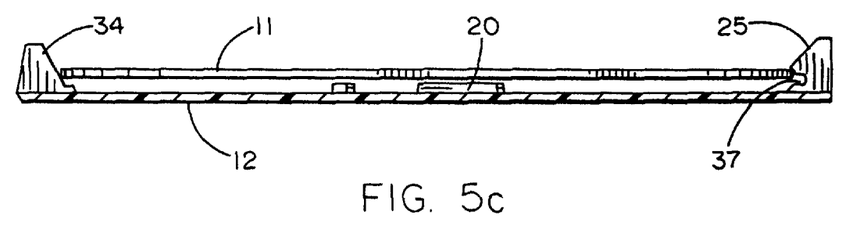
Figure 5D:
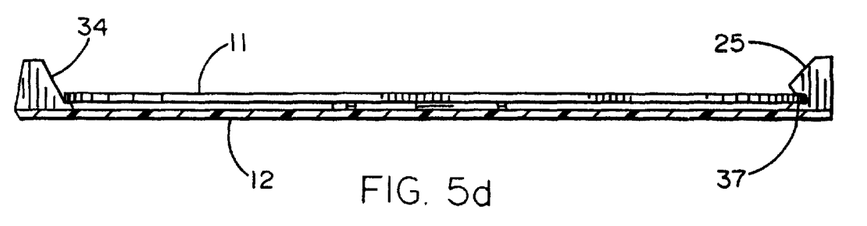

The tray side 16 interior surface also provides descent platforms 34 and 35, jewel box support 36, game ribs 38 and 44, jewel case ribs 40, 42 and 46, and game cartridge retainers 50 and 52. As seen best in FIG. 4 and FIGS. 5 and 6, a disc retainer 25 provides an inclined surface 41 and a retention notch 37 and a spline cam or cam member 48 on spline 24, provides a cam surface 54. The functions of these various structural devices within enclosure 10 will now be described in conjunction with FIGS. 5–7.

Figure 6A:
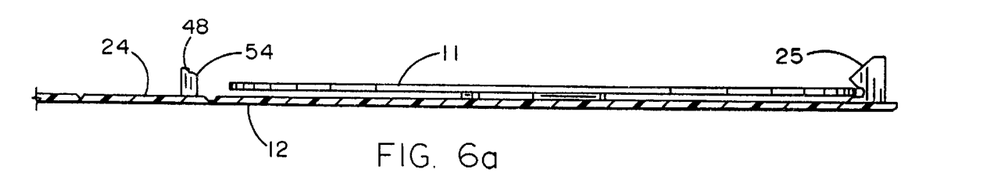
Figure 6B:
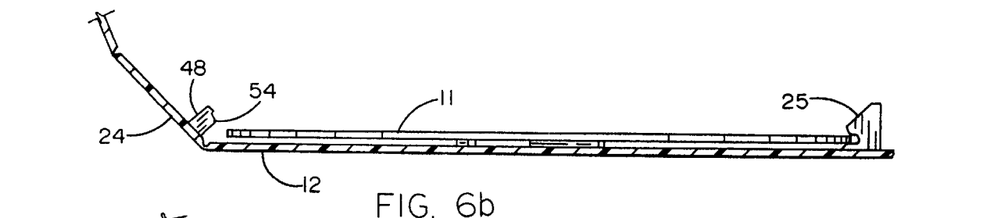
Figure 6C:
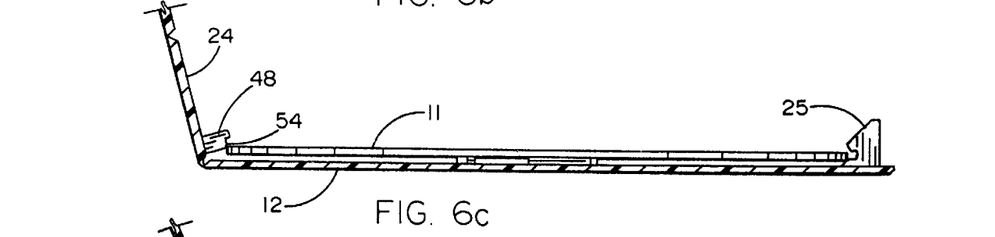
Figure 6D:
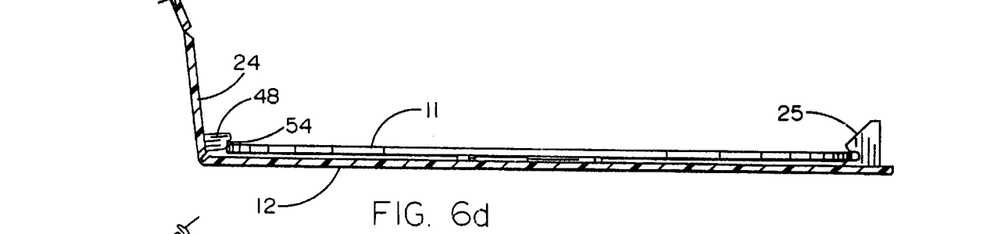
Figure 6E:
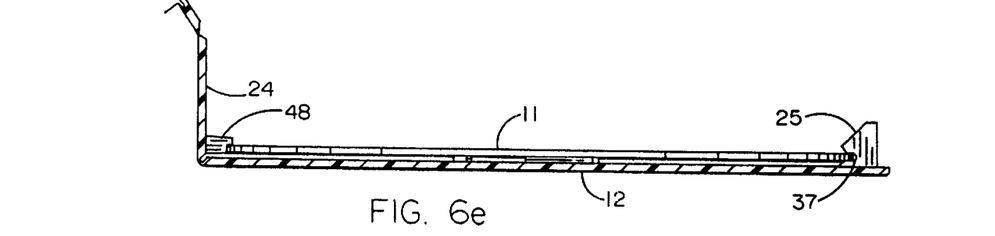

In FIG. 5, it will be seen that a digital disc 11 is installed into the tray side 12 of the media enclosure 10 by placing the disc onto the descent platforms (i.e., 34) along one edge until the opposite edge rests onto disc retainer 25 along the inclined surface 41 thereof and then slides in retention notch 37 thereof. Eventually, the central aperture of the disc 11 slides onto hub members 20 and the disc rests on (as shown best in FIG. 5d) members 20 and is captured by notch 37. The manner in which the disc 11 is effectively forced into notch 37 is shown in FIG. 6. More specifically, as spline 24 is elevated for closing enclosure 10, spline cam 48 and specifically cam surface 54 thereof, contacts the edge of the disc, forces it into notch 37 of retainer 25 and then captures the opposite edge as shown in FIG. 6e.

Thus from FIGS. 5 and 6, it will be seen that the present invention provides an easy, convenient and extremely secure way of receiving and protecting standard size digital discs.

Figure 7A:
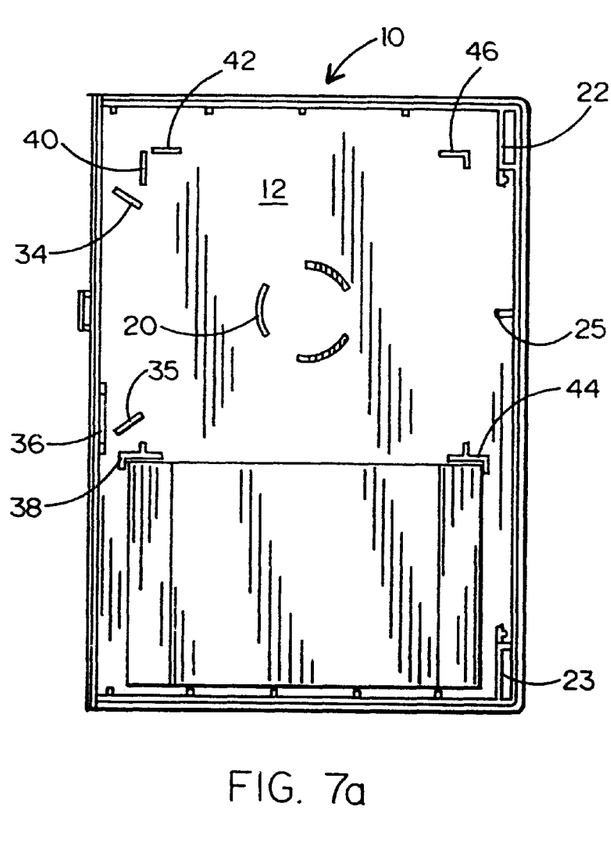
Figure 7B:
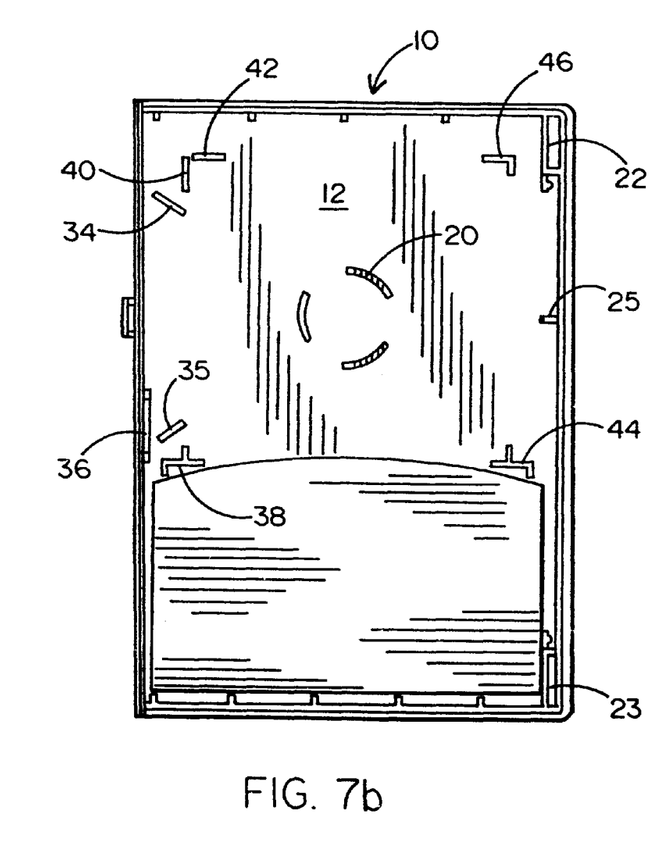
Figure 7C:
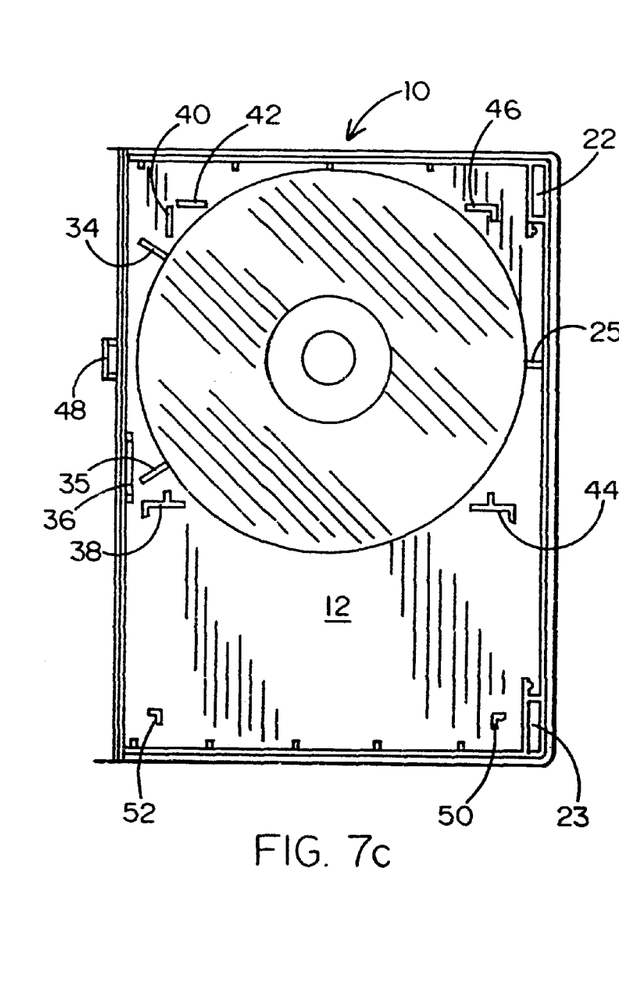
Figure 7D:
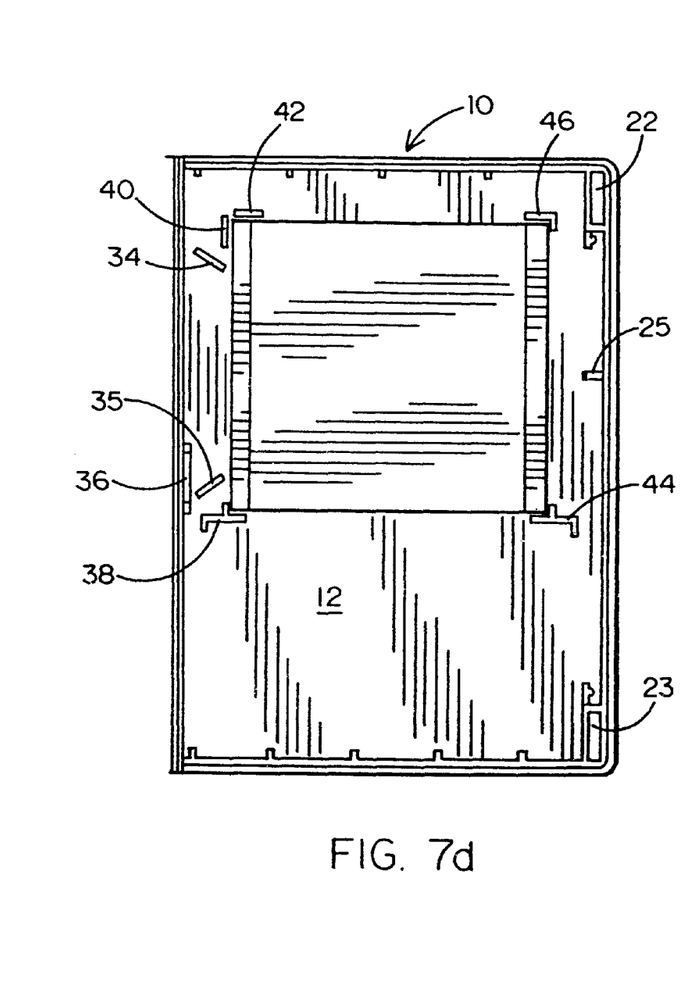
Figure 7E:
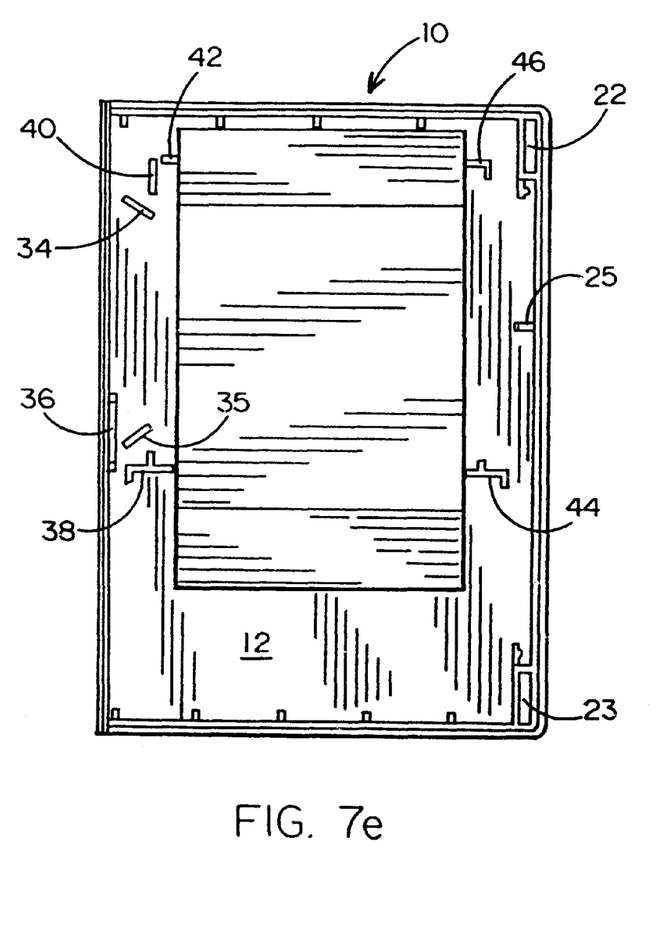
Figure 7F:
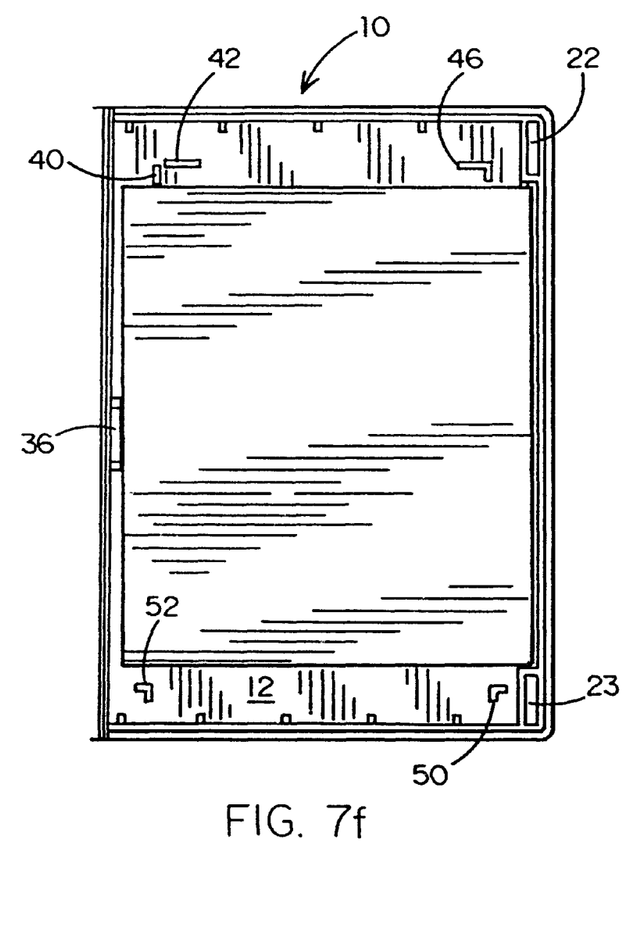

The remaining structural members of the tray side 12 of enclosure 10, provide secure interface for a plurality of differently sized media and media containers. This feature of the invention is illustrated in FIG. 7. As shown therein, the enclosure is configured for receiving a disc without its jewel box (as seen in FIG. 7c) or with its jewel box (as seen in FIG. 7f) as well as a variety of different well-known game cartridges (i.e., Nintendo) as seen in FIGS. 7a, 7b, 7d and 7e.

It will now be understood that the illustrated embodiment of the invention meets all of the aforementioned objects. Those having skill in the art of media enclosures will now, as a result of the disclosure herein, perceive various additions and modifications which may be made to the invention. By way of example, it will be seen that the invention may be readily modified to accommodate other shapes and sizes of media devices and their manufacturer supplied containers. Accordingly, all such modifications and additions are deemed to be within the scope of the invention which is limited only by the appended claims and their equivalents.

I claim:

1. An enclosure for storing a media disc and comprising:
   a rectangular tray side surface having integral walls extending therefrom;
   a cover side surface connected to said tray side surface by a spline wherein parallel alignment of said tray side and cover side surfaces forms an enclosed interior within said enclosure;
   at least one disc retainer on said tray side surface within said interior said at least one disc retainer having a notch for receiving an edge of a disc; and
   at least one cam member operative upon closing said enclosure and having a cam surface for contacting an edge of a disc substantially opposite said notch for forcing a disc into said notch of said at least one disc retainer to be secured thereby;
   wherein said at least one cam member is integral with said spline.

2. The enclosure recited in claim 1 wherein said tray side surface comprises at least one hub member for supporting a disc adjacent a central aperture of a disc.

3. The enclosure recited in claim 1 wherein said tray side surface comprises at least one inclined surface for promoting a gradual descent of a disc onto said tray side surface.

4. The enclosure recited in claim 1 further comprising means for mechanically interlocking said tray side surface and cover side surface upon closure of said enclosure.

5. An enclosure for storing a media disc and comprising:
   a rectangular tray side surface having integral walls extending therefrom;
   a cover side surface connected to said tray side surface by a spline wherein parallel alignment of said tray side and cover side surfaces forms an enclosed interior within said enclosure;
   at least one disc retainer on said tray side surface within said interior, said at least one disc retainer having a notch for receiving an edge of a disc; and
   at least one cam member operative upon closing said enclosure and having a cam surface for contacting an edge of a disc substantially opposite said notch for forcing a disc into said notch of said at least one disc retainer to be secured thereby;
   wherein said tray side surface further comprises a plurality of ribs extending integral from said tray side surface, the size and spacing of said ribs being designed to accommodate at least one jewel box container.

6. An enclosure for storing a media disc and comprising:
   a rectangular tray side surface having integral walls extending therefrom;
   a cover side surface connected to said tray side surface by a spline wherein parallel alignment of said tray side and cover side surfaces forms an enclosed interior within said enclosure;
   at least one disc retainer on said tray side surface within said interior, said at least one disc retainer having a notch for receiving an edge of a disc; and
   at least one cam member operative upon closing said enclosure and having a cam surface for contacting an edge of a disc substantially opposite said notch for forcing a disc into said notch of said at least one disc retainer to be secured thereby;
   wherein said tray side surface further comprises a plurality of ribs extending integral from said tray side surface, the size and spacing of said ribs being designed to accommodate at least one game cartridge.

7. An enclosure for storing a media disc and comprising:
   a rectangular tray side surface having integral walls extending therefrom;
   a cover side surface connected to said tray side surface by a spline wherein parallel alignment of said tray side and cover side surfaces forms an enclosed interior within said enclosure;
   at least one disc retainer on said tray side surface within said interior, said at least one disc retainer having a notch for receiving an edge of a disc; and
   at least one cam member operative upon closing said enclosure and having a cam surface for contacting an edge of a disc substantially opposite said notch for forcing a disc into said notch of said at least one disc retainer to be secured thereby;
   wherein said tray side surface further comprises a plurality of ribs extending integrally from said tray side surface, the size and spacing of said ribs being designed to alternately accommodate at least one game cartridge and at least one jewel box container.

* * * * *